United States Patent [19]

Potucek

[11] Patent Number: 4,878,794
[45] Date of Patent: Nov. 7, 1989

[54] COLLATED SCREW FASTENERS

[75] Inventor: Frank R. Potucek, Palmetto, Fla.

[73] Assignee: John W. Hall, Jr., Savannah, Ga.

[21] Appl. No.: 168,310

[22] Filed: Mar. 15, 1988

[51] Int. Cl.⁴ .................... F16B 35/00; F16B 35/04
[52] U.S. Cl. ................................ 411/395; 411/426;
                                              411/911; 10/27 R
[58] Field of Search ............... 411/178, 395, 387, 389,
        411/404, 424, 426, 911, 919; 285/392; 10/10 R,
                                              27 R, 27 PH

[56] References Cited

U.S. PATENT DOCUMENTS

| | | | |
|---|---|---|---|
| 321,483 | 7/1885 | Burrows | 285/392 |
| 446,871 | 2/1891 | Lieb | 411/389 |
| 1,172,406 | 2/1916 | Taylor | 411/395 |
| 1,925,667 | 9/1933 | Kirton | 411/911 |
| 3,778,089 | 12/1973 | Fredd et al. | 285/392 |
| 3,994,516 | 11/1976 | Fredd | 285/392 |
| 4,507,817 | 4/1985 | Staffeld | 411/395 |

Primary Examiner—Neill R. Wilson
Attorney, Agent, or Firm—Joseph C. Mason, Jr.; Ronald E. Smith

[57] ABSTRACT

A series of drywall screws are nested together and individually seated with a special driving tool after separation from one another. Each screw is hollow and has interior and exterior screw threads. One end of the screw has a hollow flat head and the body tapers downwardly to a bottom portion having a diameter less than half the diameter of the first end. A drill bit having an eccentric point drills a bore having a diameter greater than the diameter of the drill bit so that the bore operatively receives the screw.

14 Claims, 2 Drawing Sheets

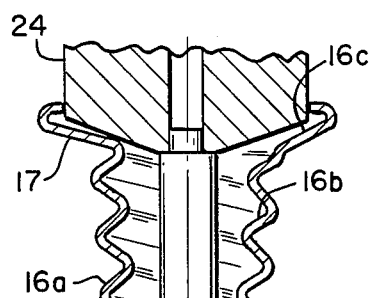
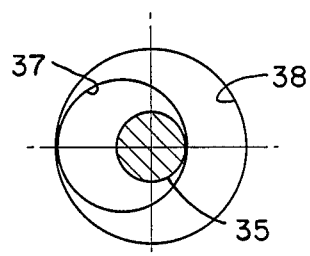
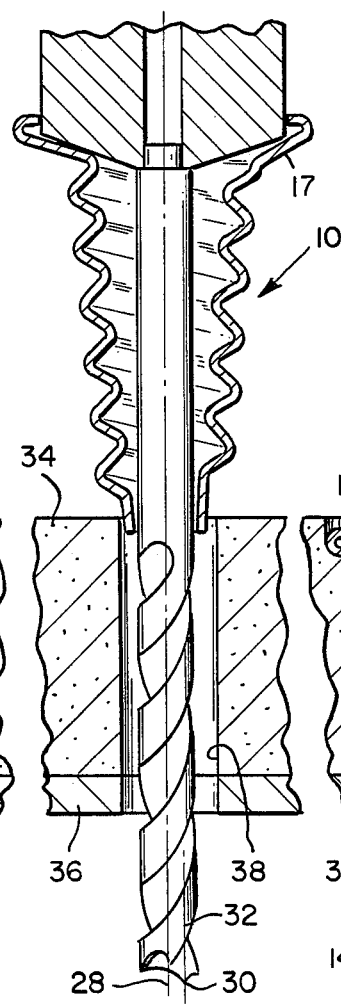
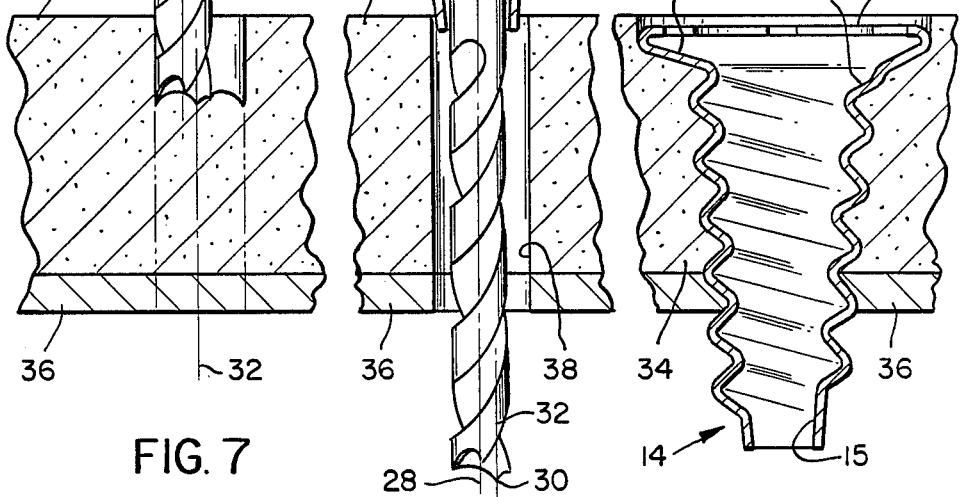

COLLATED SCREW FASTENERS

BACKGROUND OF THE INVENTION

1. Field of the Invention

This invention relates to screw fasteners. More particularly, it refers to screw fasteners usable in a stacked configuration for seating in a sheet rock panel with an automatic power tool.

2. Description of the Prior Art

There are many types of sheet rock or drywall screws in use, including many that are seated with the assistance of inserts. One example is shown in U.S. Pat. No. 4,601,625 wherein an insert having exterior threads and a drilling blade is driven into sheet rock with hand power. A standard sheet rock screw is then driven into the insert. The blade of the insert is deflected off when the screw is driven through the threaded insert. This screw and method of attaching a material to drywall will not assist in attaching the drywall board to its supporting structure. Furthermore, each screw must be seated manually and separately after an insert is seated.

The art also includes screw members which form the bores into which they are inserted; the ends of such screw members must be heat treated which fact adds to the expense of such screw members.

A screw and method of mounting drywall is needed which will provide for rapid insertion of screws, thereby facilitating more rapid mounting of drywall to its supporting structure of wood or metal.

SUMMARY OF THE INVENTION

I have invented a novel drywall screw that can be nested together with a group of like screws. Each screw is hollow and has both interior and exterior threads.

A first end of each screw has a flat head with a center placed annular opening. A second or distal end has a diameter less than half the diameter of the first or proximal end.

The screw is tapered from the proximal end to the distal end. Each screw receives in its proximal interior portion of threads, the distal exterior threads of the adjacent screw so that the nest is created.

A special driving tool is employed to seat the screws in rapid succession.

A novel eccentric drill bit point is employed to drill a bore in a wood or metal stud or support structure to which the drywall board is to be mounted, said bore having a diameter greater than the diameter of the drill bit, as a result of the eccentricity.

BRIEF DESCRIPTION OF THE DRAWINGS

The invention may be best understood by those having ordinary skill in the art by reference to the following detailed description when considered in conjunction with the accompanying drawings in which:

FIG. 6 is a diagrammatic view of the screw centerline;

FIG. 7 is a cross section of a screw on its driver near the start of a drilling step;

FIG. 8 is a cross section of a bore drilled by the driver and a screw about to be inserted;

FIG. 9 is a cross section of a screw seated in a wall board and supporting structure.

DETAILED DESCRIPTION OF PREFERRED EMBODIMENT

Figure 1:
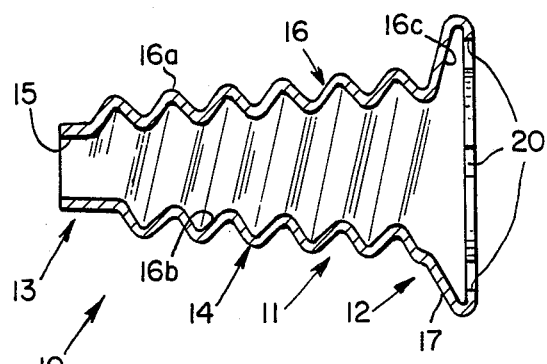
FIG. 1 is a cross section of a tubular screw of this invention.

Throughout the following detailed description, the same reference numerals refer to the same elements in all figures.

Figure 2:
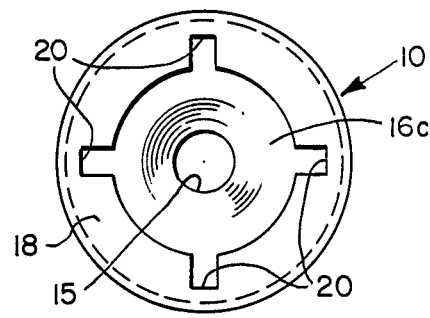
FIG. 2 is a top plan view of the screw head.

Referring now to FIG. 1, there it will be seen that a fastener means that illustrates one embodiment of the inventive concept is indicated as a whole by the reference numeral 10. Screw member 10 has a flat head portion 12 that is round in plan view as shown in FIG. 2, and has a generally cylindrical shank portion 14. Shank portion 14 tapers downwardly along its extent from its first or proximal end 11 to its second or distal end 13 as shown in FIG. 1 and certain other Figures.

The diameter of annular opening 15 is less than half the diameter of the proximal end 11 of shank 14.

Screw member 10 is hollow as shown. Sidewalls 16 of shank portion 14 thus form exterior threads 16a as well as interior threads 16b as depicted. The uppermost interior thread is denoted 16c. An annular overhang 17 (FIGS. 1 and 3) is defined by the exterior sidewall of the uppermost thread.

Figure 3:
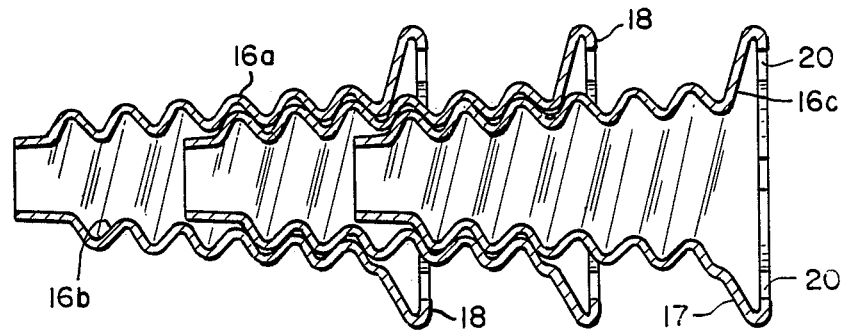
FIG. 3 is a cross section of tubular screws collated into each other.

More specifically, and as is clearly shown in FIGS. 1 and 3, screw member 10 has relatively thin sidewalls that appear to undulate along the extent of shank 14. The undulations are helical ribs that form a screw thread having a preselected lead angle as suggested by the shading in those Figures. Since the sidewalls are thin relative to the dimensions of the helical ribs, the undulations form both the external and internal threads, i.e., there is no intervening base member that separates the internal and external threads. The diameter of the helical ribs progressively diminishes along the extent of the shank.

As perhaps best depicted in FIG. 2, head portion 12 includes an annular flat 18. Flat 18 may be slotted to receive the bit of a flat head screw driver (not shown), or it may be provided with the illustrated double slot 20 for receiving the bit of a Phillip's head screw driver.

FIG. 3 shows how a plurality of the novel screw members may be nested; it should be noted that the lower or distal half of each screw member shank portion is screw threadedly received into the upper or proximal half of its receiving screw member.

The nested fasteners may be stored in the magazine of a power tool and separated automatically in serial fashion to facilitate the rapid installation of individual fasteners.

Figure 4:
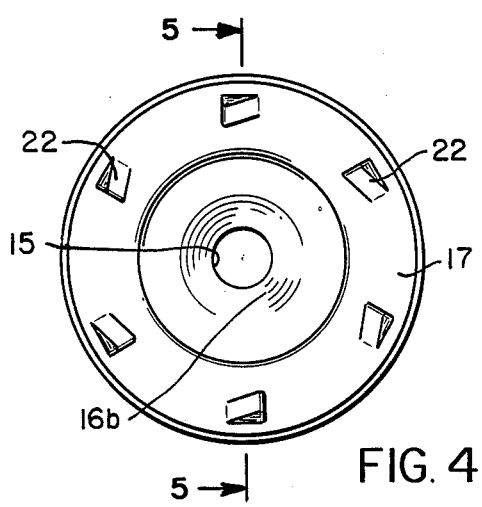
FIG. 4 is a top plan view of an alternate clutch-drive screw head.
Figure 5:
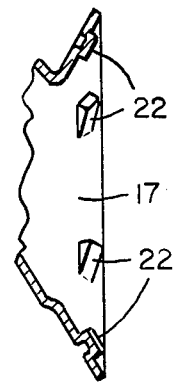
FIG. 5 is a sectional view taken along line 5—5 in FIG. 4.

FIGS. 4 and 5 depict side elevational and top plan views, respectively, of a third type of head, namely, a clutch head. Rectilinear protuberances or ramp members 22 are formed in the interior sidewall 16c and are engaged by mating members of a rotary power tool, not shown.

FIGS. 7–9 depict successive steps in the fastening procedure, from beginning to end, respectively.

In FIG. 7, an individual fastener 10 has been automatically removed from the power tool magazine, within which it had been stored in the nested manner depicted in FIG. 3, and has been engaged by a Phillip's head screw driver denoted by the reference numeral 24.

A novel drill bit 26 is also shown in FIGS. 7-9; it is driven by the power screw driver member 24 as shown. Bit 26 has a longitudinal axis of symmetry 28 and an eccentric point 30 having a centerline 32.

FIG. 7 depicts a piece of drywall 34 disposed in overlying relation to a support structure in the form of a metal stud 36, to which stud 36 said drywall board 34 is to be secured.

In FIG. 7, the drilling procedure has just begun. The eccentricity of point 30 with respect to centerline 28 of the drill bit 26 produces a bore 38 (FIG. 8) having a diameter greater than the diameter of bit 26 as shown.

As perhaps best shown in FIG. 8, the diameter of the bore is just slightly greater than the smallest diameter of the screw member 10, i.e., the diameter of bore 38 is slightly greater than the diameter of the annular opening 15. Moreover, the diameter of annular opening 15 is just slightly greater than the diameter of the drill bit. Thus, it is seen that the amount of eccentricity is selected so that the bore diameter is adequate to receive fastener 10 as perhaps best understood in connection with FIG. 8.

Bore 38 is also shown in enlarged form in FIG. 6. The cross-hatched region 35 in FIG. 6 represents the amount of offset between bit centerline 28 and the centerline 32 of point 30; circle 37 represents the eccentric arc swept out as bore 38 is formed.

The tubular screw 10 has been driven home into its final countersunk position in FIG. 9, and the operator of the tool has withdrawn bit 26. The automatic loading means of the power tool will now remove another fastener 10 from its nested disposition within the magazine, and the operator may again position the tool to repeat the procedure.

FIG. 9 shows clearly how the annular overhang region 17 of fastener 10 forms a countersunk portion in the drywall member 34 and how the external threads 16a of the fastener 10 securely and non-retractably engage the deformed interior sidewalls of bore 38. Since the head 18 of screw 10 is below the plane of drywall 34 as shown, drywall mud is applied over the screw to finish the job. More specifically, mud entering the hollow interior of the screw will form an integral mass with the thin layer of mud overlying the screw. Prior art screws, being solid, are covered with a thin layer of mud having no such underlying integral mass to improve its adhesion to the screw head. Accordingly, mud spread over the countersunk heads of conventional screws is prone to separate therefrom and fall out. Thus, this invention overcomes still another limitation of prior art drywall screws.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A fastener means, comprising:
   an elongate, hollow, tubular screw member having a head and a shank;
   said shank having a proximal end contiguous to said head and a distal end terminating in an annular opening;
   said shank being tapered along its extent;
   said annular opening having a diameter less than the inner diameter of said shank proximal end;
   a plurality of helical ribs being formed along the extent of said shank;
   an annular overhang being defined by a difference in diameter between said head and the proximal end of said shank;
   said helical ribs forming interior thread means and exterior thread means along the extent of said shank; and
   the interior thread means of about a top half of a first screw member screw threadedly receiving about a lower half of the exterior thread means of a second screw member of like size when said first and second screw members are disposed in a nesting relationship with one another.

2. The fastener means of claim 1, wherein said head includes an annular flat integral with said overhang and wherein said annular flat is slotted to receive a screw driver bit of the cruciform type.

3. The fastener means of claim 1, wherein a plurality of circumferentially spaced protuberances are formed in said overhang, said protuberances being engageable by a clutch head driver means.

4. A collated screw nest comprising multiple hollow screws each having a hollow shank portion and a hollow head portion, each shank portion having helical ribs formed therein along its extent, said head portion terminating a top end of each screw, an annular opening at a bottom end having a diameter less than the diameter of the top end, and said helical ribs forming exterior and interior threads that hold the screw nest together.

5. The collated screw nest of claim 4, wherein each screw is tapered from its top end to its bottom end.

6. The collated screw nest of claim 5, wherein the interior threads of about a top half of a first screw in the nest receive about a lower half of the exterior threads from a second screw of like size and each successive screw of like size is mounted in the same manner to an adjacent screw to form a lengthwise nest of screws.

7. A collated screw nest comprising:
   multiple hollow screws each having exterior and interior threads, a head terminating a top end of each screw and an annular opening at a bottom end having a diameter less than half of the diameter of the top end;
   each screw tapered from its top end to its bottom end;
   the interior threads of about a top half of a first screw in the nest receiving about a lower half of the external threads from a second screw and each successive screw being mounted in the same manner to an adjacent screw to form a lengthwise nest of screws.

8. The collated screw nest of claim 7, wherein the diameter of each head is greater than the diameter of each shank at said shank proximal end;
   said difference in diameter providing an annular overhang between each head portion and each shank portion.

9. The collated screw nest of claim 8, wherein each head portion includes a flat wall that lies in a plane orthogonal to the longitudinal axis of symmetry of said screw nest, wherein said flat wall is centrally apertured, and wherein four circumferentially and equidistantly spaced slots are formed about the periphery of said flat wall to enable driving of a screw in said screw nest by a screw driver having a cruciform distal end.

10. The collated screw nest of claim 8, wherein each head portion includes a flat wall that lies in a plane orthogonal to the longitudinal axis of symmetry of said screw nest, wherein said flat wall is centrally apertured, and wherein a pair of diametrically opposed slots are formed about the periphery of said flat wall to enable driving of a screw in said screw nest by a screw driver having a flat distal end.

11. The collated screw nest of claim 8, wherein plural protuberances are formed in the annular overhang of each screw member and wherein said protuberances are engageable by a clutch head drive.

12. The collated screw nest of claim 11, wherein said protuberances are circumferentially spaced in relation to one another and radially disposed relative to the longitudinal axis of symmetry of said screw member.

13. The collated screw nest of claim 12, wherein the diameter of the annular opening at a bottom end of each screw is only slightly greater than the diameter of a drill bit means extending through each hollow screw member.

14. A fastener means, comprising:

a hollow screw member of generally tubular configuration;

said screw member terminating at its distal end in an annular opening that lies in a plane orthogonal to the longitudinal axis of symmetry of the screw member;

said screw member terminating at its proximal end in a flat head that lies in a plane orthogonal to the longitudinal axis of symmetry of the screw member;

engagement means formed in said flat head whereby said means is engagable by a tool that drives said screw member;

said screw member including a shank that extends between said proximal and distal ends;

said shank being tapered downwardly along its proximal to distal extent so that the diameter of the shank and its distal end is less than its diameter at its proximal end;

a plurality of helical ribs being formed along the extent of said shank;

said helical ribs having a predetermined lead angle;

said ribs providing external and internal screw threads; and said helical ribs progressively decreasing in diameter along the proximal to distal extent of said shank.

* * * * *